United States Patent
Clune

[19]

[11] Patent Number: 5,805,325
[45] Date of Patent: Sep. 8, 1998

[54] INERTIALLY STABILIZED MIRROR SYSTEM

[75] Inventor: Lavern Charles Clune, Huntsville, Ala.

[73] Assignee: Lockheed Martin Missiles & Space Co., Sunnyvale, Calif.

[21] Appl. No.: 795,681

[22] Filed: Feb. 6, 1997

Related U.S. Application Data

[63] Continuation-in-part of Ser. No. 738,325, Oct. 25, 1996.

[51] Int. Cl.⁶ .................................................... G02B 26/08
[52] U.S. Cl. .......................... 359/226; 359/201; 359/203; 359/555; 359/900
[58] Field of Search ..................................... 359/196, 197, 359/198, 201–203, 220, 221, 223, 226, 554–556, 872–874, 876, 900

[56] References Cited

U.S. PATENT DOCUMENTS

| | | | |
|---|---|---|---|
| 3,843,226 | 10/1974 | Person | 359/223 |
| 3,891,299 | 6/1975 | Rushing | 359/223 |
| 4,105,281 | 8/1978 | Johnson et al. | 359/226 |
| 5,115,355 | 5/1992 | Dunn | 359/223 |
| 5,151,812 | 9/1992 | Watson | 359/201 |
| 5,210,636 | 5/1993 | Baer | 359/200 |
| 5,408,352 | 4/1995 | Peng | 359/201 |

*Primary Examiner*—James Phan
*Attorney, Agent, or Firm*—Feix & Feix

[57] ABSTRACT

Stabilization of pointing and stabilization mirror systems is provided by using the inherent moment of inertia of the mirrors. Inertially stabilized mirror systems have mirror orientations and rotation axes such that the mirrors reflect incident radiation parallel to the rotation axes. One mirror is provided for each axis of stabilization. In order to maintain stabilization in space for incident radiation to the mirror, any prior mirrors are provided with rotation axes parallel to the stabilization axis.

16 Claims, 4 Drawing Sheets

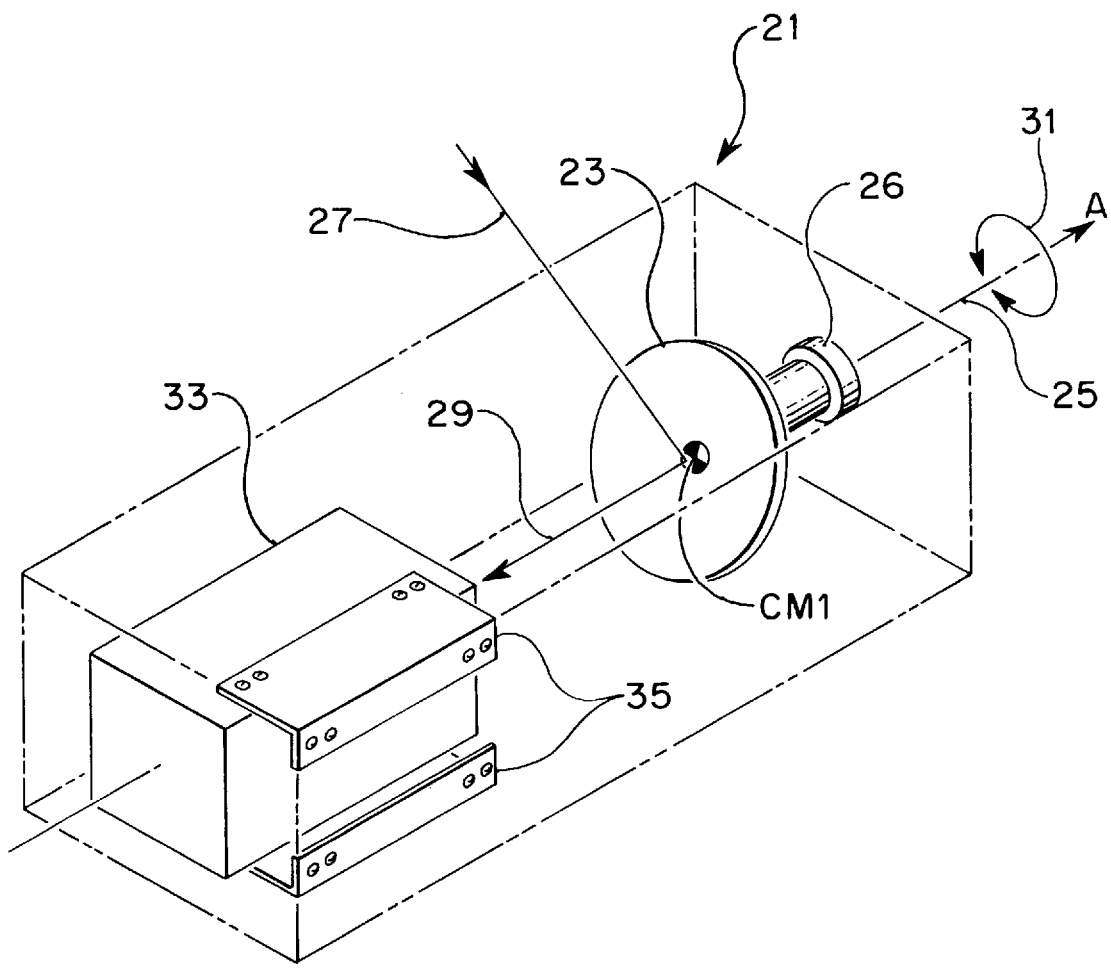

FIG_2
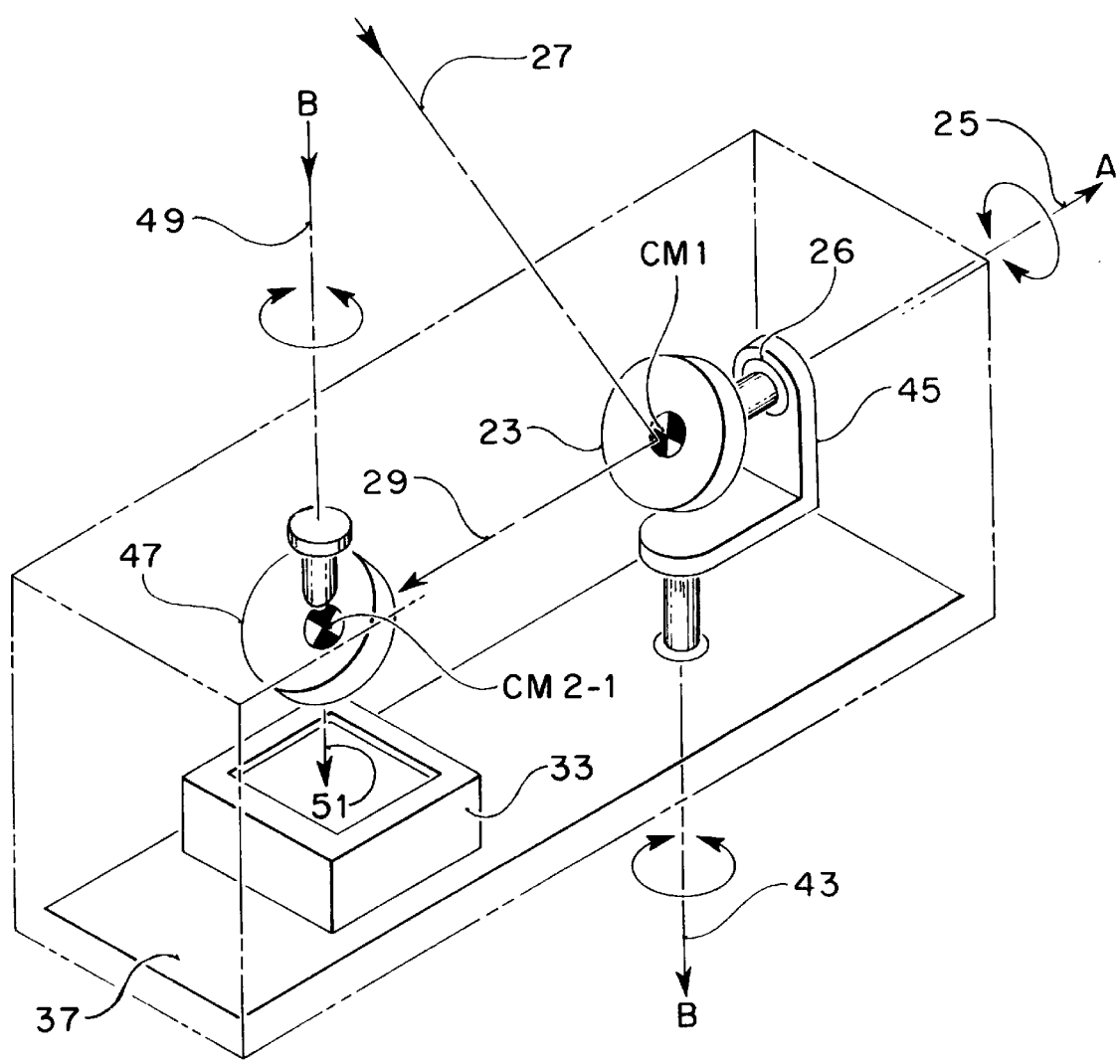

FIG_3
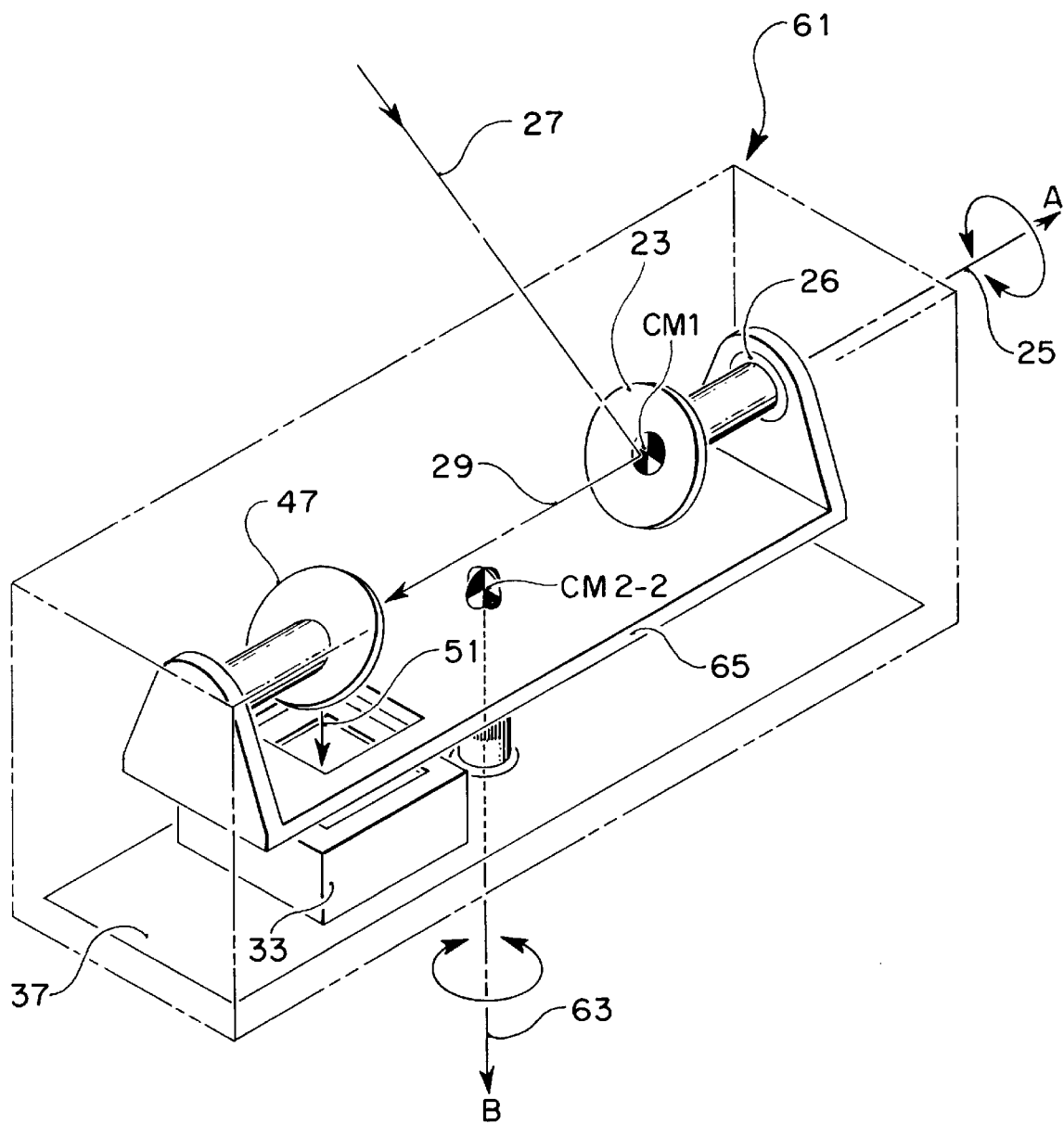

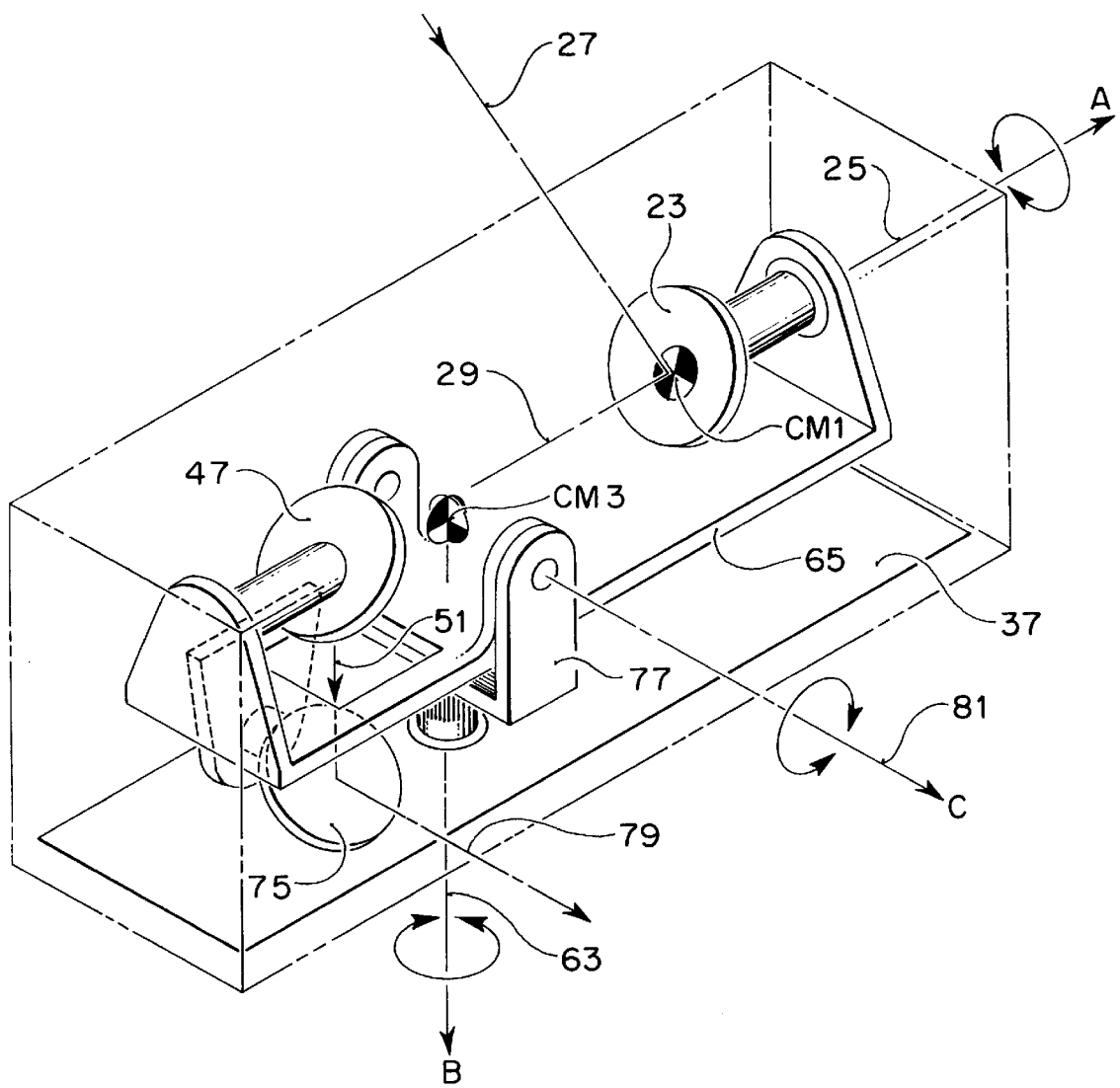
FIG_4

INERTIALLY STABILIZED MIRROR SYSTEM

RELATED APPLICATION

This application is a continuation-in-part of pending U.S. application Ser. No. 08/738,325 filed Oct. 25, 1996, entitled "COMPACT WINDOW VIEWING SYSTEM", Lavern Charles Clune, Inventor, and assigned to the same assignee as the assignee of this application. Application Ser. No. 08/738,325 is also incorporated by reference in this application.

BACKGROUND OF THE INVENTION

This invention relates to pointing and stabilization mirror systems.

This invention relates specifically to mirror stabilization systems which use the inherent moment-of-inertia of a mirror mounted on a rotation axis to maintain orientation of the mirror and stabilization of the line-of-sight observed by an optical instrument which is mounted on a platform that experiences angular and translational disturbances.

Prior pointing and stabilizing mirror systems, where stabilization to high frequency disturbances are required, have attempted to provide stabilization by using high frequency active mirror controls or gimbal mounting for the entire optical instrument.

Such prior pointing and stabilizing mirror systems have presented problems. The mirror accelerations and high frequency control loops for the mirror pointing and stabilizing mirror system have needed to be complex. The mass of the gimbal structures for gimbal mounting optical instruments has also limited the use of such systems in certain applications.

It is a primary object of the present invention to provide stabilization by using the inherent moment-of-inertia of the mirrors.

It is a related object of the present invention to obtain the required stabilization without the need to use active mirror controls or a gimbal mounting of the optical instrument.

SUMMARY OF THE PRESENT INVENTION

In the methods and apparatus of the present invention the mirror orientations and rotation axes are such that the mirrors reflect incident radiation parallel to the rotation axes. One mirror is provided for each axis of stabilization; and, in order to maintain stabilization in space for incident radiation to the mirror, any and all prior mirrors are provided with rotation axes parallel to the stabilization axes.

The inertially stabilized mirror systems of the present invention use the inherent moment-of-inertia of the pointing mirrors to provide stabilization of the line-of-sight of an optical instrument that is mounted directly to a platform that is experiencing angular and translational disturbances, thereby eliminating the need for mirror controls.

The present invention offers the advantages of gimbal mounting for inertial stabilization of line-of-sight motion caused by disturbances without the complexity and mass of the gimbal structure for mounting the optical instrument.

The inertially stabilized mirror system of the present invention can be a one dimensional mirror pointing and stabilization. The one dimensional mirror pointing and stabilization embodiment of the present invention comprises a mirror mounted on a rotation axis and oriented so that it reflects the incident radiation parallel to the rotation axis.

As the platform experiences rotational disturbances, the inherent moment of inertia of the mirror acts to maintain the orientation of the mirror resulting in a stabilized line-of-sight as observed by the optical instrument.

The center-of-mass of the mirror is located on the mirror rotation axis to prevent introduction of torque on the mirror due to translational accelerations.

In another embodiment of the present invention which provides stabilization in two dimensions, the first mirror has two rotation axes, which can be referred to as a first axis extending in an A direction and a second axis extending in a B direction. The moment of inertia of the first mirror about the first axis provides stabilization for platform angular disturbances about the first axis analogous to stabilization for the one dimensional system.

The moment-of-inertia of the first mirror about the second axis acts to maintain orientation of the mirror about the second axis, thus providing second axis stabilization of line-of-sight in space—but not relative to the optical instrument.

To complete the second axis stabilization relative to the optical instrument, the second mirror is provided with a second rotation axis and is oriented so that it reflects radiation parallel to the rotation axis, thus providing stabilization analogous to one dimensional pitch axis stabilization.

The present invention includes another embodiment in which pointing and stabilization in three dimensions is achieved by providing a third mirror and providing a rotation axis to all three mirrors that is perpendicular to the first and second axes of the two dimensional implementation. The third mirror is oriented so that it reflects radiation parallel to the third rotation axis. The additional rotation axis on the first two mirrors provides stabilization in space, and the rotation axis on the third mirror, combined with reflection of radiation parallel to the axis, provides stabilization in the third axis of the line-of-sight as viewed by the optical instrument.

The mirror rotation axes should be orthogonal for best attenuation of line-of-sight motion caused by disturbances. However, the effects on attenuation scale as the sine of the departure from orthogonality so that good attenuation can be achieved with significant departures from orthogonality.

For ideal (torque free) implementations of the rotation axes, the inertially stabilized mirror system provides complete attenuation of the line-of-sight motion for the on-axis line-of-sight direction for which the mirrors deflect the radiation parallel to the rotation axes. Attenuation in other directions is proportional to the sine of the angle that the radiation direction departs from the on-axis direction. Thus, significant attenuation is provided over large field-of-views, for example, a factor of 10 attenuation is provided over a 6 degree half-field-of-view.

Inertially stabilized mirror system methods and apparatus which incorporate the features described above and which are effective to function as described above comprise additional, specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is an isometric view showing an inertially stabilized mirror system constructed in accordance with one embodiment of the present invention. FIG. 1 shows a one dimensional mirror pointing and stabilization. In FIG. 1 a single mirror is mounted for rotation about an axis of rotation and is oriented so that the mirror reflects the incident radiation parallel to the first axis of rotation. An optical instrument is mounted on a platform and on a line-of-sight to observe the radiation reflected by the first mirror. The platform experiences angular and translational disturbances during at least some periods of operation. The center-of-mass of the mirror is located on the axis of rotation to prevent introduction of torque on the mirror due to translational accelerations. The one dimensional mirror pointing and stabilization system shown in FIG. 1 uses the inherent moment-of-inertia of the mirror to maintain the orientation of the mirror so as to result in a stabilized line-of-sight as observed by the optical instrument during the periods of angular disturbances.

FIG. 2 is an isometric view of an inertially stabilized mirror system constructed in accordance with a second embodiment of the invention. FIG. 2 illustrates a two dimensional mirror pointing and stabilization. The first mirror in the FIG. 2 system has rotation axes extending in a first A direction and in a second B direction. The moment-of-inertia of the first mirror about the first axis extending in the A direction provides stabilization for platform angular disturbances about the first axis analogous to the stabilization for the one dimensional mirror system shown in FIG. 1. The moment-of-inertia of the first mirror about the second axis extending in the B direction acts to maintain the orientation of the mirror about the second axis, thus providing second axis stabilization of the line-of-sight in space, but not relative to the optical instrument. To complete the second axis stabilization relative to the optical instrument, the second mirror is provided with a rotation axis extending in the second B direction and is oriented so that it reflects radiation parallel to the rotation axis, thus providing stabilization analogous to one dimensional first axis stabilization of the FIG. 1 embodiment.

FIG. 3 is an isometric view illustrating a third embodiment of the present invention. In the FIG. 3 embodiment the inertially stabilized mirror system is constructed to provide a two dimensional mirror pointing and stabilization. In the FIG. 3 embodiment two mirrors are mechanically coupled so as to rotate about a single second axis extending in the B direction.

FIG. 4 is an isometric view like FIG. 3 but showing an inertially stabilized mirror system for pointing and stabilization in three dimensions. In FIG. 4 a third mirror is oriented so that it deflects radiation parallel to a third rotation axis extending in the C direction.

DETAILED DESCRIPTION OF THE PREFERRED EMBODIMENTS

An inertially stabilized mirror system constructed in accordance with one embodiment of the invention is indicated generally by reference numeral 21 in FIG. 1.

The system 21 shown in FIG. 1 is a one dimensional mirror pointing and stabilization system and comprises a first mirror 23 mounted for rotation about an axis of rotation 25.

The mirror 23 is rotatable about the axis 25 as indicated by the rotation indicating arrows 31.

The mirror 23 is oriented so that the mirror 23 reflects the incident radiation parallel to the axis of rotation 25.

In FIG. 1 the incident radiation is indicated by the line 27 and the reflected radiation is indicated by the line 29.

The mirror 23 is mounted for rotation about the axis 25 by any one of a number of mechanisms. The rotational mounting mechanism should be efficient and should minimize rotational torque. High efficiency bearings and flex pivots may be used. For purposes of illustration a bearing 26 is shown as the rotational mounting structure in FIG. 1 and in certain other figures of this application.

It is an important feature of the present invention that the center-of-mass CM1 of the mirror 23 is located on the axis 25 of rotation to prevent the introduction of torque on the mirror 23 due to translational accelerations.

It should be noted that the term "mirror", as used in this application, includes not only the mirror itself but also the associated assembly that is mounted for rotation about a particular axis of rotation with that particular mirror.

An optical instrument 33 is mounted on a platform 37 on a line-of-sight to observe the radiation reflected by the mirror 23.

Various kinds of mounting structures can be used. For purposes of illustration, mounting brackets 35 are shown in FIG. 1.

The platform 37 on which the optical instrument 33 is mounted experiences angular and translational disturbances during at least some periods of operation.

In some applications of the present invention, the disturbances may have frequencies of 100 cycles per second or greater.

By having the center-of-mass CM1 of the mirror 23 located on the axis 25 (and by using a high quality, relatively friction free rotational mounting for the mirror 23 for rotation about the axis 25) and by orienting the mirror 23 so that the mirror 23 reflects the radiation 29 parallel to the axis 25 of rotation, the present invention uses the inherent moment-of-inertia of the mirror to maintain the orientation of the mirror so as to result in a stabilized line-of-sight as observed by the optical instrument during the periods of angular and translational disturbances of the platform and optical instrument.

The locating of the center-of-mass of the mirror on the axis of rotation decouples the mirror from the translational disturbances experienced by the platform so that the mirror stays still during such translational disturbances.

For ideal (torque free) implementations of the rotation axis 25, the inertially stabilized mirror system shown in FIG. 1 provides complete attenuation of line-of-sight motion for the on axis line-of-sight direction for which the mirror 23 deflects the radiation parallel to the rotation axis 25.

Attenuation in other directions is proportional to the sine of the angle that the radiation direction departs from the on axis direction.

Thus, significant attenuation is provided over large field-of-views, for example, a factor of ten attenuation is provided over a six degree half-field-of-view.

Practical implementations of the inertially stabilized mirror system will have mechanisms, e.g. bearings or flex points, that introduce finite amounts of torque.

These finite torques should be kept small so as not to excessively limit the lowest frequency (in the case of frictional torques) or the maximum amplitudes (in the case of restoring torques) for which the inertially stabilized mirror system is effective.

A second embodiment of an inertially stabilized mirror system constructed in accordance with the present invention is indicated generally by the reference numeral 41 in FIG. 2.

In the FIG. 2 embodiment components which correspond to like components in FIG. 1 are indicated by the same reference numerals.

The inertially stabilized mirror system 41 shown in FIG. 2 is a two dimensional mirror pointing and stabilization system.

In the FIG. 2 embodiment 41 the center-of-mass CM1 of the first mirror 23 is located on the axis 25 of rotation, and the mirror 23 is oriented to reflect the incident radiation parallel to the rotation axis 25. In the FIG. 2 embodiment 41 the mirror 23 is also mounted for rotation about an additional axis 43 by a structure 45.

The axis 25 extends in a first axis direction A and the axis 43 extends in a second axis direction B.

The moment-of-inertia of the mirror 23 about the axis 25 provides stabilization for platform angular disturbances about the axis 25 analogous to stabilization for the one dimensional mirror system shown in FIG. 1.

The moment-of-inertia of mirror 23 about the second axis 43 acts to maintain orientation of the mirror about the second axis, thus providing second axis stabilization of line-of-sight in space—but not relative to the optical instrument 33.

To complete the second axis stabilization relative to the optical instrument 33, a second mirror 47 is mounted for rotation about an axis 49. The axis 49 extends parallel to the axis 43 in the axis direction B.

The mirror 47 is oriented so that it reflects radiation, in the direction indicated by the line 51, parallel to the axis 49.

The center-of-mass CM2-1 of the second mirror 47 is located on the axis 49 of rotation.

This provides stabilization relative to the optical instrument 33 analogous to the one dimensional axis stabilization shown in FIG. 1.

Although the axes 43 and 49 extending in the axis direction B are shown as separate implementations in FIG. 2, the two axes can be combined into a single axis if the two mirrors 23 and 47 are mechanically coupled so that they rotate together.

This embodiment of the present invention is shown in FIG. 3 and is indicated generally by the reference numeral 61.

The single axis of rotation extending in the axis direction B is indicated by the reference numeral 63 in the FIG. 3 embodiment 61.

In the FIG. 3 embodiment 61 the two mirrors 23 and 47 are mechanically coupled together by the coupling 65.

The center-of-mass CM2 of the entire assembly, consisting of the coupling 65 and the mirrors 23 and 47, is centered on the axis 63 to prevent the introduction of torques about the axis 63 due to translational accelerations.

The inertially stabilized mirror system of the present invention can be extended to pointing and stabilization in three dimensions by providing a third mirror (and by providing a third rotation axis to all three mirrors that extends in an axis direction C is perpendicular to the two axes of the two dimensional representations shown in FIGS. 2 and 3.

FIG. 4 illustrates an inertially stabilized mirror system 71 which provides pointing and stabilization in three dimensions in accordance with another embodiment of the present invention.

In the system 71 a third mirror 75 is mounted on the coupling 65, and the coupling 65 is mounted by a structure 77 for rotation about a third axis 81 which extends in an axis direction C. The center-of-mass CM3 of the entire assembly, consisting of structure 77, coupling 65 and associated mirrors 23, 47 and 75, is located on the axis 81 to prevent the introduction of torques about axis 81 due to translational accelerations.

The center-of-mass CM3 is also located on the axis 63 to prevent introduction of torques about the axis 63 due to translational accelerations.

The mirror 75 is oriented so that it reflects the incident radiation 51 in a direction 79 parallel to the rotation axis 81 and to the optical instrument 33.

As the platform 37 experiences rotational disturbances, the inherent moment-of-inertia of the entire assembly, consisting of structure 77, coupling 65 and associated mirrors 23, 47 and 75, acts to maintain the orientation of the mirror 75 resulting in a stabilized line-of-sight as observed by the optical instrument 33.

The optical instrument 33 is not shown in FIG. 4, but it is attached to the platform 37 so that it moves with the platform 37.

The rotation axis 81 for the third mirror 75 combined with reflection of radiation parallel to the axis 81 provides stabilization in the third axis 81 of the line-of-sight as viewed by the optical instrument 33.

It should be noted that the third mirror 75 could be a separate implementation with separate axes; and, in that event, the differences between (a) the separate axes implementation of the third mirror 75 and (b) the mechanically coupled implementation shown in FIG. 4 would be like the differences between (a) the FIG. 3 and (b) the FIG. 2 implementations for the two mirror system.

In the various embodiments of the present invention the mirror rotation axes should be orthogonal for best attenuation of line-of-sight motion caused by disturbances. However, as discussed in more detail above in this application, the effects on attenuation scale as the sign of departure from orthogonality so that good attenuation can be achieved with significant departures from orthogonality.

The number and sequence of mirror rotation axes will depend on the application.

For example, the third axis 81 will not be necessary for many endoatmospheric vehicle applications where the inherent stiffness of the vehicle can make the amplitude of angular disturbances about a roll axis negligibly small.

Also endoatmospheric vehicles typically require large field-of-regard about the pitch axis but not about the yaw axis. The configuration shown in either FIG. 2 or in FIG. 3 is compatible with this application. The axis 25 can be associated with the pitch axis and the axis 63 can be associated with the yaw axis. As the structure in FIG. 2 or FIG. 3 rotates with small yaw motion about the axis 63, the axis 25 remains nearly aligned with the pitch axis of the vehicle (thus remaining effective in attenuating line-of-sight motion due to pitch disturbances).

Other applications of the inertially stabilized mirror system of the present invention include cameras and other motion dampening applications.

The various embodiments of the inertially stabilized mirror system of the present invention result in a stabilized line-of-sight as observed by the optical instrument during periods of angular and translational disturbances of the platform on which the optical instrument is mounted.

The various embodiments of the present invention provide the stabilization without the need to use active mirror controls or a gimbal mounting of the optical instrument.

In the various embodiments of the invention the center-of-mass of all parts of an assembly that rotate about a particular axis is located on that axis of rotation.

Counter balances can be used as necessary to keep the particular center-of-mass located on the particular axis.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A method of using the inherent moment-of-inertia of a mirror mounted on a rotation axis to maintain orientation of the mirror and stabilization of the line-of-sight observed by an optical instrument mounted on a platform that experiences angular and translational disturbances, said method comprising, mounting a first mirror for rotation about a first axis of rotation, orienting the first mirror so that the first mirror reflects the incident radiation parallel to the first axis of rotation, locating the center-of-mass of the first mirror on the first axis of rotation to prevent introduction of torque on the first mirror due to translational accelerations, and using the inherent moment-of-inertia of the first mirror to maintain the orientation of the first mirror so as to result in a stabilized line-of-sight as observed by the optical instrument.

2. The invention defined in claim 1 including, mounting a second mirror for rotation about a second axis of rotation, mounting the first mirror for rotation about an axis of rotation which extends in the same direction as said second axis of rotation, orienting the second mirror so that the second mirror receives the radiation reflected from said first mirror and reflects the radiation parallel to the second axis of rotation and on the line-of-sight to the optical instrument, locating the center-of-mass of the second mirror on the second axis of rotation to prevent introduction of torque on the second mirror due to translational accelerations, and using the inherent moment-of-inertia of the second mirror to maintain the orientation of the second mirror to provide stabilization of the line-of-sight of the optical instrument during said periods of angular and translational disturbances.

3. The invention defined in claim 2 wherein the first and second mirrors are mechanically coupled so that the first and second mirrors rotate together about said second axis.

4. The invention defined in claim 2 including, mounting a third mirror for rotation about a third axis of rotation, mounting the second mirror for rotation about an axis of rotation which extends in the same direction as said third axis of rotation, orienting the third mirror so that the third mirror receives the radiation reflected from the second mirror and reflects the radiation parallel to the third axis of rotation and on the light of sight to the optical instrument, locating the center-of-mass of the third mirror on the third axis of rotation to prevent introduction of torque on the third mirror due to translational accelerations, and using the inherent moment-of-inertia of the third mirror to maintain the orientation of the third mirror to provide stabilization of the line-of-sight of the optical instrument during said periods of angular and translational disturbances.

5. The invention defined in claim 4 wherein the third axis of rotation is substantially orthogonal to the second axis of rotation and wherein the second axis of rotation is substantially orthogonal to the first axis of rotation.

6. The invention defined in claim 4 wherein the second and third mirrors are mechanically coupled so that the second and third mirrors rotate together about said third axis.

7. The invention defined in claim 4 wherein said using of the inherent moment of inertia of each of the mirrors about mirror rotation axes with said locating of the center-of-mass on the rotation axes provide said stabilization of the line-of-sight without the need to use active mirror controls or a gimbal mounting of the optical instrument.

8. The invention defined in claim 4 wherein said using the inherent moment of inertia of each of the mirrors about rotation axes with said locating of the center-of-mass on the rotation axes decouple the mirrors from the angular and translational disturbances experienced by said platform so that the mirrors stay still during such angular and translational disturbances.

9. Apparatus for using the inherent moment-of-inertia of a mirror mounted on a rotation axis to maintain orientation of the mirror and stabilization of the line-of-sight observed by an optical instrument mounted on a platform that experiences angular and translational disturbances, said apparatus comprising, a first mirror mounted for rotation about a first axis of rotation, said mirror being oriented so that the first mirror reflects the incident radiation parallel to the first axis of rotation, said mirror having its center-of-mass located on the first axis of rotation to prevent introduction of torque on the first mirror due to translational accelerations, and wherein the inherent moment-of-inertia of the first mirror maintains the orientation of the first mirror so as to result in a stabilized line-of-sight as observed by the optical instrument.

10. The invention defined in claim 9 including, a second mirror mounted for rotation about a second axis of rotation, said first mirror being also mounted for rotation about an axis of rotation which extends in the same direction as said second axis of rotation, the second mirror being oriented so that the second mirror receives the radiation reflected from said first mirror and reflects the radiation parallel to the second axis of rotation and on the line-of-sight to the optical instrument, said second mirror having its center-of-mass located on the second axis of rotation to prevent introduction of torque on the second mirror due to translational accelerations, and wherein the inherent moment-of-inertia of the second mirror maintains the orientation of the second mirror to provide stabilization of the line-of-sight of the optical instrument during said periods of angular and translational disturbances.

11. The invention defined in claim 10 wherein the first and second mirrors are mechanically coupled to the first and second mirrors rotate together about said second axis.

12. The invention defined in claim 10 including, a third mirror mounted for rotation about a third axis of rotation, said second mirror being mounted for rotation about an axis of rotation which extends in the same direction as said third axis of rotation, said third mirror being oriented so that the third mirror receives the radiation reflected from the second mirror and reflects the radiation parallel to the third axis of rotation and on the light of sight to the optical instrument, said third mirror having its center-of-mass located on the third axis of rotation to prevent introduction of torque on the third mirror due to translational accelerations, and wherein the inherent moment-of-inertia of the third mirror maintains the orientation of the third mirror to provide stabilization of the line-of-sight of the optical instrument during said periods of angular and translational disturbances.

13. The invention defined in claim 12 wherein the third axis of rotation is substantially orthogonal to the second axis of rotation and wherein the second axis of rotation is orthogonal to the first axis of rotation.

14. The invention defined in claim 12 wherein the second and third mirrors are mechanically coupled so that the second and third mirrors rotate together about said second axis.

15. The invention defined in claim 12 wherein said using of the inherent moment of inertia of each of the mirrors about mirror rotation axes with said locating of the center-of-mass on the rotation axes provide said stabilization of the line-of-sight without the need to use active mirror controls or a gimbal mounting of the optical instrument.

16. The invention defined in claim 12 wherein said using the inherent moment of inertia of each of the mirrors about rotation axes with said locating of the center-of mass on the rotation axes decouple the mirrors from the angular and translational disturbances experienced by said platform so that the mirrors stay still during such angular and translational disturbances.

* * * * *